(12) United States Patent
Hasselbach et al.

(10) Patent No.: US 11,579,259 B2
(45) Date of Patent: Feb. 14, 2023

(54) LASER SCANNER, FOR EXAMPLE FOR A LIDAR SYSTEM OF A DRIVER ASSISTANCE SYSTEM

(71) Applicant: Robert Bosch GmbH, Stuttgart (DE)

(72) Inventors: Juergen Hasselbach, Tamm (DE); Alexander Greiner, Reichenbach (DE)

(73) Assignee: Robert Bosch GmbH, Stuttgart (DE)

( * ) Notice: Subject to any disclaimer, the term of this patent is extended or adjusted under 35 U.S.C. 154(b) by 438 days.

(21) Appl. No.: 16/647,823

(22) PCT Filed: Sep. 21, 2018

(86) PCT No.: PCT/EP2018/075549
§ 371 (c)(1),
(2) Date: Apr. 27, 2020

(87) PCT Pub. No.: WO2019/057865
PCT Pub. Date: Mar. 28, 2019

(65) Prior Publication Data
US 2020/0309918 A1  Oct. 1, 2020

(30) Foreign Application Priority Data
Sep. 22, 2017 (DE) .................. 10 2017 216 826.9

(51) Int. Cl.
*G01S 7/481* (2006.01)
*G01S 17/931* (2020.01)
*G02B 26/10* (2006.01)

(52) U.S. Cl.
CPC .......... *G01S 7/4817* (2013.01); *G01S 7/4811* (2013.01); *G01S 17/931* (2020.01); *G02B 26/105* (2013.01)

(58) Field of Classification Search
CPC ............................ G01S 7/4817; G01S 7/4811
See application file for complete search history.

(56) References Cited

U.S. PATENT DOCUMENTS 6,507,036 B1    1/2003  Godin
2006/0139717 A1* 6/2006  Miyagawa ........... G02B 27/283
                                                            359/204.3

(Continued)

FOREIGN PATENT DOCUMENTS

| DE | 102007048681 A1 | 4/2009 |
| DE | 102008013906 A1 | 10/2009 |
| DE | 102008019615 A1 | 11/2009 |

(Continued)

OTHER PUBLICATIONS

International Search Report dated Dec. 6, 2018 for corresponding International Application PCT/EP2018/075549.

*Primary Examiner* — Jerry T Jean Baptiste
(74) *Attorney, Agent, or Firm* — Norton Rose Fulbright US LLP; Gerard Messina

(57) ABSTRACT

A laser scanner that includes a transmission path and a reception path that is spatially separate from the transmission path, at least in areas. In the laser scanner, the transmission path and the reception path meet on opposite sides of an angularly movable deflection mirror of the laser scanner. An angular position of the deflection mirror in the transmission path defines a scan angle of a laser light of the laser scanner, and the angular position in the reception path compensates for an incidence angle of a reflection of the laser light.

7 Claims, 2 Drawing Sheets

(56) References Cited

U.S. PATENT DOCUMENTS

2009/0122377 A1\* 5/2009 Wagner .................. G02B 7/023
  359/200.7
2009/0303417 A1\* 12/2009 Mizushima ........ G02B 19/0057
  349/65

FOREIGN PATENT DOCUMENTS

DE  102015217908 A1  3/2017
DE  102016221245 A1  5/2018

\* cited by examiner

LASER SCANNER, FOR EXAMPLE FOR A LIDAR SYSTEM OF A DRIVER ASSISTANCE SYSTEM

FIELD

The present invention relates to a laser scanner for a LIDAR system, for example for a driver assistance system.

BACKGROUND INFORMATION

A LIDAR system may optically scan a setting, using a laser scanner. The laser scanner emits a laser beam, having a scan angle that is changeable in at least one axis, into a detection range. The laser beam is reflected on objects in the detection range. The LIDAR system may compute a distance and a direction from the object, based on a scan angle and a propagation time of the laser beam and its reflection. This may be utilized, for example, for a driver assistance system in a motor vehicle.

SUMMARY

In accordance with the present invention, an example laser scanner is provided. Advantageous refinements and improvements of the present invention are described herein.

In accordance with an example embodiment of the present invention, a laser scanner that includes a transmission path and a reception path that is spatially separate from the transmitter path, at least in areas, is provided, including that the transmission path and the reception path meet on opposite sides of an angularly movable deflection mirror of the laser scanner, an angular position of the deflection mirror in the transmission path defining a scan angle of a laser light of the laser scanner, and the angular position in the reception path compensating for an incidence angle of a reflection of the laser light.

Specific embodiments of the present invention may be regarded as based, among other things, on the concepts and findings described below.

In an example laser scanner, at least one laser beam is guided by an optical system into a detection range of the laser scanner. An angle of the laser beam is changed over time in at least one spatial direction in order to scan the detection range in numerous successive measurements. When the laser beam strikes an object, for example an object in the detection range or the ground, the laser light of the laser beam is scattered on the object. A portion of the scattered laser light is reflected back in the direction of the laser scanner. The reflected-back scattered laser light is guided by an optical system of the laser scanner onto a detector of the laser scanner.

The directed laser light originating from a laser source, with its known, controllable properties, behaves differently than the laser light that is reflected back from an object. Optimized optical systems and/or filters may be used in each case for both types of laser light to achieve good detection performance of the laser scanner. A laser scanner that includes two separate paths for the laser light may be used for different optical systems and/or filters.

To scan the detection range, a beam angle is applied to the directed laser light during transmission. The laser light is thus emitted in a certain direction, and may strike an object situated in the direction toward the laser scanner. The laser light reflected back from the object arrives once again at the laser scanner from the direction. During reception, an incidence angle of the back-reflected laser light may be compensated for in order to align the back-reflected laser light with the detector and to be able to use a simple, nonimaging type of detector with minimal dimensions, which is also cost-effective. The same deflection element may be used for applying the beam angle and compensating for the incidence angle, since the beam angle to be applied and the incidence angle to be compensated for have the same magnitude. When the angles are applied via opposite sides of the deflection element and once again compensated for, angle sums in the transmission path and in the reception path correspond to one another.

In accordance with the present invention, separate paths are used for the directed laser light and the scattered laser light, the two paths meeting from opposite directions on different sides of the same deflection element in order to apply the beam angle and to compensate for the incidence angle.

A transmission path may be understood to mean an optical path or route that is optimized to guide the directed laser light from the laser light source into the detection range of the laser scanner. A reception path may be an optical path or route that is optimized to transport the scattered laser light from the detection range to the detector of the laser scanner. A deflection mirror may be a micromirror. The deflection mirror may be pivotably supported about a pivot point in which the transmission path and the reception path intersect. The deflection mirror may be a front-reflecting mirror on both sides.

Specific example embodiments of the present invention may advantageously allow use of filters in the particular paths that are specifically coordinated with the directed laser light or with the scattered laser light. Due to the compensation for the incidence angle of the scattered laser light, a simple nonimaging detector may be used, since the back-reflected laser light is always guided onto the same area of the detector. The size of sensor pixels of the detector is not limited by an optical resolution of the detector, resulting in a high level of sensitivity of the detector.

The deflection mirror may be angularly movable about two axes. The axes extend transversely, preferably perpendicularly, with respect to one another. The deflection mirror may thus deflect laser light in two different directions. Due to the reflection on both sides of the deflection mirror, imaging errors are compensated for in such a way that the two-dimensional deflection is possible using a single mirror. Due to the two-dimensional deflection, the laser scanner may detect flat objects using one deflection mirror.

The angular position of the deflection mirror may define an impact point of the laser light on a beam-forming unit of the laser scanner; the beam-forming unit may be designed to form the laser light, emitted by the laser scanner, as a function of the impact point. The beam-forming unit may expand the laser light with an increased beam angle, for example. The laser light may then be simultaneously transmitted into a larger area.

The beam-forming unit may include a matrix made up of beam-forming elements. Each beam-forming element may be designed to form a scanning beam having a fixed scan angle when the laser light strikes the beam-forming element. A beam-forming element may form the laser light with a defined shape and/or deflect it by a defined angle. A beam-forming element acts in a similar way when it is struck by the laser light.

The beam-forming unit may be designed to form in each case at least two divergent scanning beams from the laser light as a function of the impact point. Multiple beam-forming elements may be simultaneously illuminated by the laser light. All simultaneously illuminated beam-forming elements may form a scanning beam in each case. The scanning beams may diverge, for example. A beam fan made up of scanning beams may thus always be transmitted into the detection range.

A detector of the laser scanner may include multiple sensor pixels. The number of sensor pixels may correspond at least to the number of the simultaneously emitted scanning beams. The sensor pixels may be arranged in a grid. The scanning beams may project a similar grid into the detection range. At least one sensor pixel in each case may be associated with a scanning beam. Due to the compensation via the angular position of the deflection mirror, reflections from differently oriented beam fans are always imaged on the same position of the detector. For example, the reflection of a central scanning beam of the beam fan is always imaged on a central sensor pixel of the detector, although the various beam fans are oriented at different scan angles.

The laser scanner may include a transceiver optical system that is situated in the transmission path and in the reception path for coaxially transmitting the laser light and receiving the reflection. A beam splitter for deflecting the reflection into the reception path may be situated between the transceiver optical system and the deflection mirror. A parallax error may be avoided by coaxial transmission and reception. Likewise, optical system components may be saved. Only one lens or one aperture is necessary for the coaxial transmission and reception, thus allowing installation space to be saved.

At least one tilted mirror may be situated in the transmission path and/or in the reception path to deflect the particular optical axis on the deflection mirror. Tilted mirrors may be fixed-angle mirrors. The tilted mirrors may be front-reflecting. The tilted mirrors may be distorting mirrors with a convex or concave mirror surface. Tilted mirrors may also be flat mirrors. As a distorting mirror, a tilted mirror may take on the function of an optically active component. For example, a distorting mirror may focus or collimate. A mirror may provide an optical function without additional diffraction errors.

A transmission axis and a reception axis may coincide with a rotational axis of the deflection mirror on the opposite side of the deflection mirror, between a light source and a detector. The tilted mirror situated in the transmission path and/or in the reception path, together with the deflection mirror, may be movable about the rotational axis on a circular path around the rotational axis. The transmission beam thus extends about the laser scanner, and the laser scanner may detect objects in all directions. The transmission beam and the back-reflected reflections are aligned with one another due to the corotating tilted mirrors.

BRIEF DESCRIPTION OF THE DRAWINGS

Specific embodiments of the present invention are described below with reference to the figures; neither the figures nor the description are to be construed as limiting to the present invention.

The figures are strictly schematic and are not true to scale. Identical or functionally equivalent features are denoted by the same reference numerals in the figures.

DETAILED DESCRIPTION OF EXAMPLE EMBODIMENTS

Figure 1:
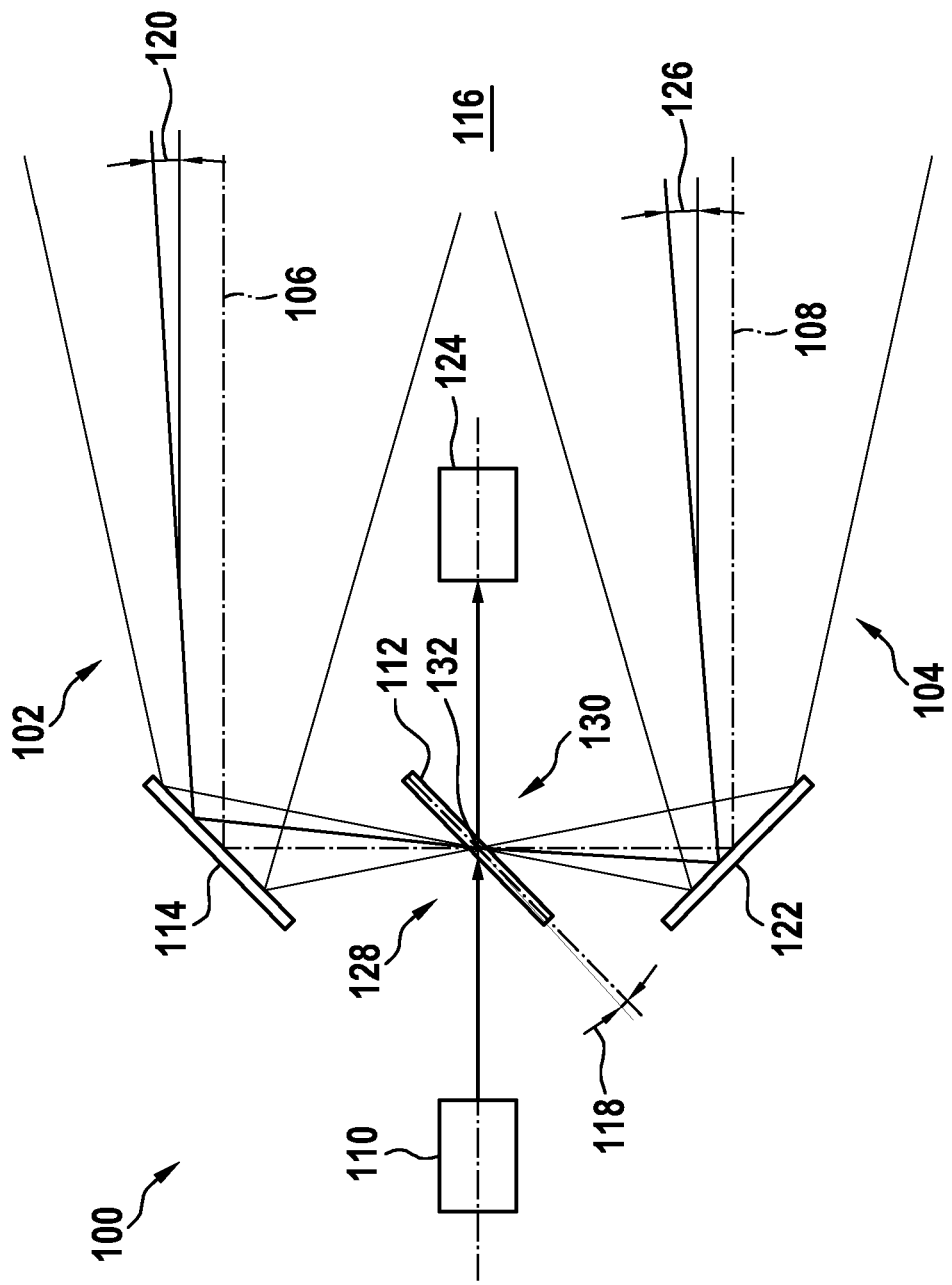
FIG. 1 shows a schematic diagram of a laser scanner according to one exemplary embodiment.

FIG. 1 shows a schematic diagram of a laser scanner 100 according to one exemplary embodiment of the present invention. Laser scanner 100 includes a transmission path 102 and a separate reception path 104. Transmission path 102 has an optical transmission axis 106 that exits from laser scanner 100, offset in parallel to an optical reception axis 108 of reception path 104. Transmission path 102 begins at a laser light source 110 of laser scanner 100 and extends via an angularly movable deflection mirror 112 and via a fixed tilted mirror 114 into a detection range 116 of laser scanner 100. An angular position 118 of deflection mirror 112 determines a reflection angle 120 of the laser light from laser scanner 100. Further optically active elements that effectuate an angular gain and/or beam expansion, for example, may be situated in transmission path 102. Reception path 104 begins in detection range 116, extends via a further fixed tilted mirror 122 and deflection mirror 112, and ends at a detector 124 of laser scanner 100. Angular position 118 of deflection mirror 112 compensates for an incidence angle 126 of a reflection of the laser light from detection range 116. Further optically active elements may likewise be situated in reception path 104. For example, these elements may act as light collectors and/or may be designed to compensate for the effects of the optical elements in transmission path 102. Transmission path 102 and reception path 104 are deflected on opposite sides 128, 130 of deflection mirror 112. Deflection mirror 112 is situated between laser light source 110 and detector 124. Light source 110 is directed onto a pivot point 132 of deflection mirror 112. Deflection mirror 112 is also situated between tilted mirror 114 and further tilted mirror 122.

In one exemplary embodiment of the present invention, light source 110 and detector 124 have a static design on one axis. Deflection mirror 112 is angularly movable in a single axis. Deflection mirror 112 together with all other optical components is pivotably supported about this axis. The optical components move about the axis on circular paths that are oriented perpendicularly with respect to the axis.

In other words, in this exemplary embodiment of the present invention, a rotational axis of deflection mirror 112 is oriented transversely with respect to a plane of the drawing in FIG. 1 and passes through the plane of the drawing. Deflection mirror 112 is tilted at an angle with respect to the plane of the drawing and the rotational axis. Transmission axis 106 between light source 110 and deflection mirror 112 coincides with the rotational axis of deflection mirror 112. Reception axis 108 between deflection mirror 112 and detector 124 likewise coincides with the rotational axis. The laser light is thus deflected from deflection mirror 112 into the plane of the drawing, radially with respect to the rotational axis. Tilted mirrors 114, 122 move synchronously with deflection mirror 112 about the rotational axis on a circular path situated in the plane of the drawing. Tilted mirrors 114, 122, together with deflection mirror 112 and other optical components not illustrated here, may be situated, for example, on a shared rotor of the laser scanner that is pivotably supported about the rotational axis. Due to tilted mirror 114 that is moved synchronously with deflection mirror 112 on the circular path, the laser light is deflected into detection range 116, tangentially with respect to the circular path. The reflection is deflected onto deflection mirror 112, radially with respect to the rotational axis, by further tilted mirror 122, which is likewise moved synchronously with respect to deflection mirror 112 on the circular path, from an incidence direction, oriented tangentially with respect to the circular path, and is deflected by deflection mirror 112 out of the plane of the drawing in the direction of the rotational axis.

A macroscanner may be a system that is rotationally movable in at least one axis. For example, horizontal resolutions of up to 360° may be achieved in this way. A high level of eye safety as well as a very large range or measuring distance are achievable due to large transmission apertures or reception apertures. Large dimensions of the transmission aperture and the reception aperture likewise have a positive effect on the insensitivity to raindrops as well as dust particles and dirt particles. For this purpose, these systems have a large installation size, a low frame rate, and a low possible resolution in the nonrotating axis.

A coaxial scanner includes a shared transceiver optical system. In a biaxial system the transmission path and the reception path are completely separate from one another. The coaxial macroscanner system may be rotationally movable in the horizontal direction. The vertical resolution may be achieved with a plurality of transmission sources. The biaxial design has a so-called parallax error.

Systems that achieve the transmission beam deflection with the aid of a micromirror that moves in alternation may be referred to as microscanners. Since only a very small micromirror is moved in this type of laser scanner design, microscanners are often referred to as solid state systems. These systems are characterized by their relatively small design, high frame rates, and compactly achievable beam deflections in the horizontal and vertical directions, for example via a 2D micromirror. In this regard, the maximum angle deflection with regard to the maximum possible scannable visual field and the possible beam expansion are limited due to the mirror dimensions. In addition, eye safety and robustness against soiling of the transmission aperture or reception aperture are reduced [sic]. In the ideal case, coaxial microscanners may be implemented on the detector side using only a single photodiode, which potentially allows large cost savings due to the smaller detector surface. This is possible due to the mirror position, which is unambiguous for each scanning point. For biaxial systems, the resolution is to be provided with the aid of a detector array, which makes the entire visual field that is to be scanned associatable with each measuring point in an unambiguous manner.

A microscanner may also have a coaxial design with a beam expansion based on micro-optics. The beam expansion is sufficient for large measuring distances without at the same time reducing the scan angle of the transmission beam, and provides adequate eye safety. The general problem of the tradeoff between the beam expansion and the deflection angle may be avoided by using micro-optical elements.

For an offset coaxial LIDAR with partial flash, a 1D transmission beam deflection may be imaged on a constant pixel on the detector side, despite strong decoupling from the transceiver side. Measurements may be parallelized and the measuring rate increased due to the partial flash operation. A 2D scanning beam deflection may likewise be approximately compensated for. The decoupled design of the two optical paths also allows a high level of flexibility with regard to specific optimization options for optical components.

Figure 2:
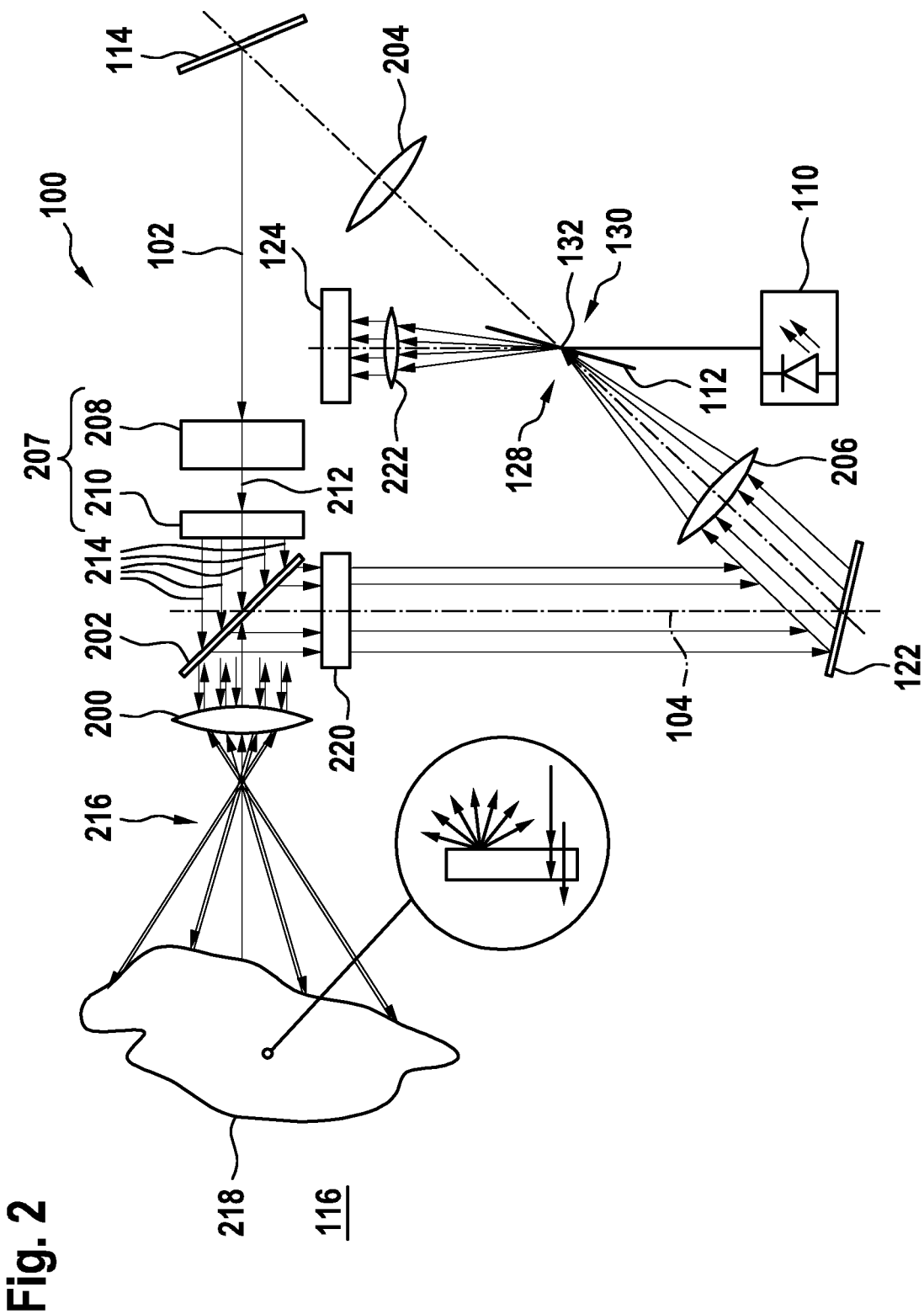
FIG. 2 shows an illustration of a laser scanner according to one exemplary embodiment.

FIG. 2 shows an illustration of a laser scanner 100 according to one exemplary embodiment of the present invention. Laser scanner 100 corresponds to the principle of the laser scanner in FIG. 1. In contrast, laser scanner 100 has a coaxial design here, which means that transmission path 102 and reception path 104 of laser scanner 100 extend through the same transceiver optical system 200. For this purpose, the laser scanner includes a beam splitter 202 in which reception path 104 is laterally deflected out of the reception path, while transmission path 102 extends linearly through beam splitter 202. Alternatively, beam splitter 202 may couple transmission path 102 from the side into linearly extending reception path 104.

Collimation optics 204 are situated between tilted mirror 114 in transmission path 102 and deflection mirror 112. The laser light of light source 110 is collimated by collimation optics 204. Focusing optics 206 are situated between further tilted mirror 122 in reception path 104 and deflection mirror 112. The light of the reflections is focused onto pivot point 132 of tilted mirror 112 by focusing optics 206.

A beam-forming unit 207 is situated in transmission path 102. Beam-forming unit 207 here includes a beam expansion unit 208 and a beam duplicator 210. The angular position of deflection mirror 112 determines an impact point of the laser light on beam-forming unit 207.

After tilted mirror 114, the collimated laser light strikes beam expansion unit 208. The laser light, which up to this point has been strongly bundled, is expanded in beam expansion unit 208. The expanded laser light illuminates a larger surface area than does the bundled laser light. The expanded laser light strikes beam duplicator 210. Multiple scanning beams 214 are formed from a single expanded laser beam 212 in beam duplicator 210. Different scanning beams are formed as a function of the impact point. Scanning beams 214 extend through beam splitter 202 and transceiver optical system 200 into detection range 116. Transceiver optical system 200 fans scanning beams 214 to form a beam fan 216. The angular position of deflection mirror 112 determines a solid angle in which a central scanning beam 214 of beam fan 216 is emitted. In other words, beam fan 216 is swiveled through detection range 116 as a function of the angular position of deflection mirror 112.

In one exemplary embodiment of the present invention, beam duplicator 210 includes a matrix made up of beam-forming elements. The beam-forming elements may be holographic optical elements, for example. An optical function for a scanning beam 214 is stored in each holographic optical element. Expanded laser beam 212 always strikes at least two of the holographic optical elements, as the result of which at least two scanning beams 214 are always generated.

An object 218 that is struck by at least one of the scanning beams 214 of beam fan 216 is situated in detection range 116. Scanning beams 216 are diffusely scattered on object 218. A small portion of the laser light is reflected back as a reflection in the direction of transceiver optical system 200. This portion of the reflected laser light is decoupled from transmission path 102 in beam splitter 202, and strikes a beam parallelizer 220 in reception path 104. The light is parallelized in beam parallelizer 220 and deflected to focusing optics 206 by further tilted mirror 122.

The incidence angle of the focused light is compensated for by the angular position of deflection mirror 112 and is deflected in the direction of detector 124. Further collimation optics 222 are situated between deflection mirror 112 and detector 124. The deflected light collimated in this way strikes detector 124.

Detector 124 includes multiple sensor pixels. The number of sensor pixels is correlated with the number of simultaneously emitted scanning beams 214. For example, detector 124 may include one sensor pixel for each scanning beam 214. Due to the compensation of deflection mirror 112, the light of the reflection of a certain scanning beam 214 always strikes the same sensor pixel, regardless of the scan angle of beam fan 216.

In accordance with the present invention, macroscopically movable components are avoided, since no rotating system is present, and a small design with p-mirrors, for example, is used. A high level of mechanical robustness is thus achieved. In laser scanner 100 provided here, the large transmission aperture results in a high level of eye safety and high robustness against particles, dust, and dirt. The large reception aperture results in a large range. Parallax errors are avoided due to the coaxial beam path. Decoupling takes place between the maximum necessary deflection angle of mirror 112 and the maximum possible visual field (FoV) of the system. The deflection angle is at a minimum and the visual field is at a maximum. The measuring rate is increased by multiple simultaneous measurements. Very strong decoupling of the transmission side with respect to the reception side with a simultaneous minimum detector surface results, despite the coaxial beam path. The imaging of a 2D deflection of the transmission beam is mapped onto a constant pixel on the detector side, without systematic errors.

In other words, FIG. 2 shows a schematic diagram of a 2D offset coaxial system with a deflection mirror that is used on both sides. The 2D deflection of the transmission beam is constantly mapped onto a pixel on the detector side, without systematic errors. The system provided here may project a 2D scanning beam deflection onto a constant pixel, with simultaneous decoupling of the transmission path and the reception path, using the front side and rear side of the deflection mirror for the transmission side or reception side.

The illustrated system is designed in such a way that the magnitudes of the angles correspond on the transmission side and the reception side. The system has a point-symmetrical design with respect to the rotation point of the deflection mirror. The single point in the system that allows the compensation for all deflection positions of the mirror on the transmission side on a single detector point, without systematic errors of the imaging position, is situated exactly on the opposite side of the transmission deflection position of the mirror. For an infinitely thin mirror, this point would coincide with the rotation point or pivot point of the mirror, and would thus correspond to a single point. Although the two points are spaced apart from one another by an actual thickness of the mirror, this results only in a constant offset of the imaging due to the symmetrical design.

A trigger pulse for the light propagation time measurement may be tapped at the beam splitter. The system configuration is variable. For example, the laser source and the detector may be directed in such a way that the incidence angles of the particular beams become steeper, resulting in a larger possible scanning area.

Lastly, it is pointed out that terms such as "having," "including," etc., do not exclude other elements or steps, and terms such as "a" or "an" do not exclude a plurality.

What is claimed is:

1. A laser scanner, comprising:
    a laser source configured to emit laser light;
    an angularly moveable deflection mirror; and
    a beam-forming unit, wherein the angular position defines an impact point of the laser light on the beam-forming unit, the beam-forming unit configured to form the laser light, emitted by the laser scanner, as a function of the impact point;
    wherein the laser scanner includes a transmission path and a reception path that is spatially separate from the transmission path, at least in areas, and wherein the transmission path and the reception path meet on opposite sides of the deflection mirror, an angular position of the deflection mirror in the transmission path defining a scan angle of the laser light, and the angular position in the reception path compensating for an incidence angle of a reflection of the laser light, and
    wherein the beam-forming unit includes a matrix made up of beam-forming elements, each beam-forming element being configured to form a scanning beam having a fixed scan angle when the laser light strikes the beam-forming element.

2. The laser scanner as recited in claim 1, wherein the deflection mirror is angularly movable with respect to two axes.

3. The laser scanner as recited in claim 1, wherein the beam-forming unit is configured to form at least two divergent scanning beams from the laser light as a function of the impact point.

4. The laser scanner as recited in claim 3, further comprising:
    a detector including sensor pixels, a number of sensor pixels corresponding at least to a number of the simultaneously emitted scanning beams.

5. The laser scanner as recited in claim 1, further comprising:
    a transceiver optical system that is situated in the transmission path and in the reception path configured to coaxially transmit the laser light and receive the reflection; and
    a beam splitter, configured to deflecting the reflection into the reception path, and being situated between the transceiver optical system and the deflection mirror.

6. The laser scanner as recited in claim 1, further comprising:
    at least one tilted mirror situated in the transmission path and/or in the reception path to deflect a transmission optical axis and/or a reception optical axis, on the deflection mirror.

7. The laser scanner as recited in claim 6, wherein a transmission axis and a reception axis coincide with a rotational axis of the deflection mirror on the opposite side of the deflection mirror, between the laser light source and a detector, the tilted mirror situated in the transmission path and/or in the reception path, together with the deflection mirror, being movable about the rotational axis on a circular path around the rotational axis.

* * * * *